(12) United States Patent
Xu

(10) Patent No.: US 8,733,712 B2
(45) Date of Patent: May 27, 2014

(54) EXTENDABLE, TELESCOPING MONOPOD

(71) Applicant: Ye Xu, Bellaire, TX (US)

(72) Inventor: Ye Xu, Bellaire, TX (US)

( * ) Notice: Subject to any disclaimer, the term of this patent is extended or adjusted under 35 U.S.C. 154(b) by 8 days.

(21) Appl. No.: 13/650,402

(22) Filed: Oct. 12, 2012

(65) Prior Publication Data

US 2013/0287386 A1    Oct. 31, 2013

Related U.S. Application Data

(60) Provisional application No. 61/640,533, filed on Apr. 30, 2012.

(51) Int. Cl.
F16M 11/00    (2006.01)
(52) U.S. Cl.
USPC .................. 248/161; 248/187.1; 248/404
(58) Field of Classification Search
USPC ............ 248/157, 161, 162.1, 177.1, 188.5, 248/295.11, 297.11
See application file for complete search history.

(56) References Cited

U.S. PATENT DOCUMENTS

| 2,733,885 | A | * | 2/1956 | Brown | 248/161 |
| 4,419,025 | A |   | 12/1983 | Takahashi | |
| 4,496,228 | A | * | 1/1985 | Schmidt | 396/428 |
| 5,011,104 | A | * | 4/1991 | Fang | 248/125.8 |
| 5,056,278 | A | * | 10/1991 | Atsukawa | 52/108 |
| 5,106,043 | A | * | 4/1992 | Solomon | 248/161 |
| 5,114,109 | A | * | 5/1992 | Fitz et al. | 248/404 |
| 7,374,139 | B2 | * | 5/2008 | Tsai et al. | 248/161 |
| 2005/0236534 | A1 | | 10/2005 | Bondesen | |

FOREIGN PATENT DOCUMENTS

| BE | 899228 A2 | 7/1984 |
| RU | 2109902 C1 | 4/1998 |
| WO | 0173340 A1 | 4/2001 |
| WO | 0132054 | 5/2001 |
| WO | 2011023861 A1 | 3/2011 |

* cited by examiner

Primary Examiner — Gwendolyn W Baxter
(74) Attorney, Agent, or Firm — Benjamin Aaron Adler

(57) ABSTRACT

Provided herein is a monopod or device for supporting a photographic instrument or accessory, such as a camera. The monopod or device comprises extendable members, e.g., an extendable mounting member with a mounting assembly and an extendable middle member with a threadably engagable, rotatable locking mechanism, a base member and an extension mechanism. The locking mechanism is configured to quickly lock the extendable members at an extended length or to collapse the same. The extension mechanism is disposed within the extendable and base members and secured independently to the same. This configuration enables a single smooth release with extending motion of the locking mechanism to telescopically extend or, conversely, collapse the extendable member portions of the monopod device.

14 Claims, 4 Drawing Sheets

FIG. 3
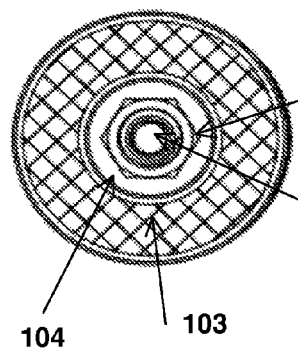
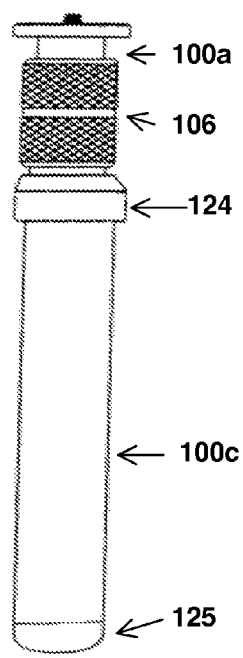
FIG. 4A
FIG. 4B
FIG. 4C

EXTENDABLE, TELESCOPING MONOPOD

CROSS-REFERENCE TO RELATED APPLICATIONS

This non-provisional application claims benefit of priority under 35 U.S.C. §119(e) of provisional application U.S. Ser. No. 61/640, 533, filed Apr. 30, 2012, the entirety of which is hereby incorporated by reference.

BACKGROUND OF THE INVENTION

1. Field of the Invention

The present invention relates generally to the fields of digital photography and videography and photographic support devices and systems. More specifically, the present invention relates to a handheld, telescoping monopod support device for providing extended photographic views.

2. Description of the Related Art

Photographic support systems are well-known in the art. Such support systems, for example, may comprise a tripod to set up a stationary shot or a monopod for shots that require elevation, such as shooting over a crowd. Because monopods for camera support are handheld, it is key that a monopod is of a sturdy, but lightweight construction that is collapsible to a length easily held and/or transported by a user. Moreover, since many photographic opportunities occur quickly, it is advantageous to have a monopod that is easily extended to a desired length and secured in position with a minimum of manipulation.

Thus, there is a recognized need in the art for an improved monopod device. Particularly, the prior art is deficient in a handheld, extendable, telescoping monopod configured or designed to be easily and quickly extended and secured at variable lengths with a single smooth motion by the user. The present invention fulfills this longstanding need and desire in the art.

SUMMARY OF THE INVENTION

The present invention is directed to a device for supporting a photographic instrument or accessory. The device comprises extendable members, a base member configured to receive the extendable members therein and an extension mechanism configured to extend the extendable members simultaneously from within the base member. The present invention is directed to a related device further comprising a locking assembly configured to threadably lock the extendable members at an extended length.

The present invention also is directed to a monopod for supporting a camera. The monopod comprises an extendable mounting member with a first substantially tubular configuration and having a camera mounting assembly disposed thereon. The monopod also comprises an extendable middle member with a second substantially tubular configuration within which the extendable mounting member is slidably disposed. The monopod also comprises a locking assembly configured to threadably secure the extendable mounting member and the extendable middle member in extended or collapsed relationship one to the other. The monopod also comprises a base member with a third substantially tubular configuration within which the extendable middle member is slidably disposed. The monopod also comprises an extension mechanism disposed within the base member, where each of the members is secured independently to the extension mechanism in a configuration whereby both of the extendable mounting member and the extendable middle member telescope simultaneously from within the base member to an extended length upon movement of the extension member.

Other and further aspects, features, and advantages of the present invention will be apparent from the following description of the presently preferred embodiments of the invention given for the purpose of disclosure.

BRIEF DESCRIPTION OF THE DRAWINGS

So that the matter in which the above-recited features, advantages and objects of the invention, as well as others that will become clear, are attained and can be understood in detail, more particular descriptions of the invention briefly summarized above may be had by reference to certain embodiments thereof that are illustrated in the appended drawings. These drawings form a part of the specification. It is to be noted, however, that the appended drawings illustrate preferred embodiments of the invention and therefore are not to be considered limiting in their scope.

FIG. 3 is a top view of the base platform (FIG. 3A).

FIGS. 4A-4C are side views of the collapsed monopod device (FIG. 4A), the partially telescoped monopod device (FIG. 4B) and the completely telescoped monopod device (FIG. 4C).

DETAILED DESCRIPTION OF THE INVENTION

Figure 1:
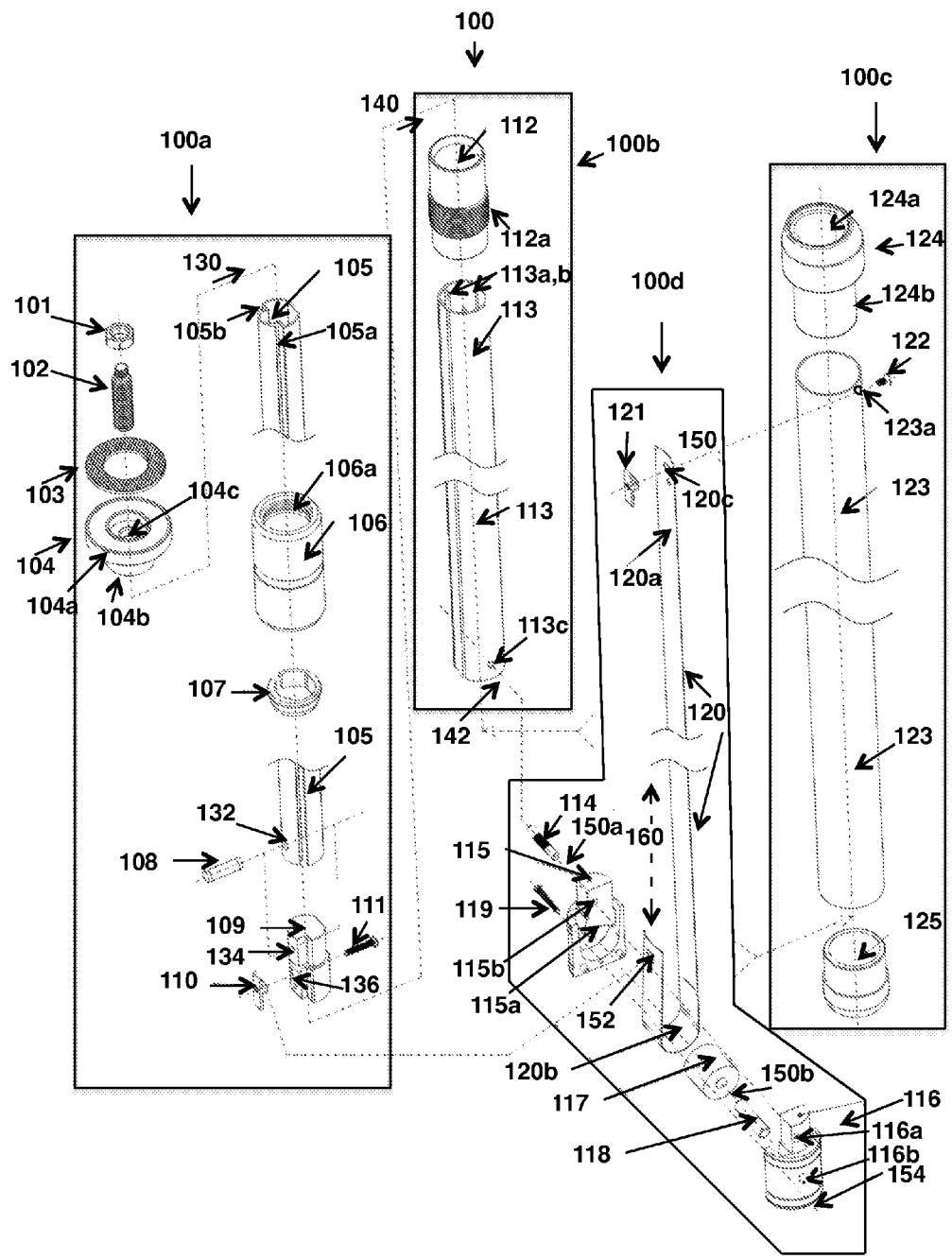
FIG. 1 is an exploded view of the monopod device.

As used herein in the specification, "a" or "an" may mean one or more. As used herein in the claim(s), when used in conjunction with the word "comprising", the words "a" or "an" may mean one or more than one.

As used herein "another" or "other" may mean at least a second or more of the same or different claim element or components thereof. Similarly, the word "or" is intended to include "and" unless the context clearly indicates otherwise. "Comprise" means "include."

As used herein, the term "about" refers to a numeric value, including, for example, whole numbers, fractions, and percentages, whether or not explicitly indicated. The term "about" generally refers to a range of numerical values (e.g., +/−5-10% of the recited value) that one of ordinary skill in the art would consider equivalent to the recited value (e.g., having the same function or result). In some instances, the term "about" may include numerical values that are rounded to the nearest significant figure.

As used herein, the terms "proximal" and "distal" refers to a position, location or disposition that is nearer to or farther from the ground, respectively, as a user holds the device or the monopod vertically.

In one embodiment of the present invention there is provided a device for supporting a photographic accessory, comprising extendable members; a base member configured to receive the extendable members therein; and an extension mechanism configured to extend the extendable members simultaneously from within the base member.

Further to this embodiment, the device comprises a locking assembly configured to threadably lock the extendable members at an extended length. In this further embodiment the locking assembly may comprise a male threaded component disposed around an outer surface of one extendable member and a female threaded component threadably engaged with the male threaded component. Also, the locking assembly may be a quick release locking assembly.

In both embodiments the extendable members may comprise a first inner tubular member and a second middle tubular member. Particularly, the first inner tubular member is extendable from within the second middle tubular member and the second middle tubular member is extendable from within the base member. Also, the first inner tubular member may have affixed at a distal end thereof a mounting assembly configured to threadably receive and secure the photographic instrument or accessory thereto. An exemplary mounting assembly may comprise a base platform with a threaded opening therethrough configured to threadably receive a thread connector therein, said thread connector also configured to threadably engage with an attachment point on photographic instrument or accessory such that the same is secured to the base platform. Furthermore, the mounting assembly may comprise a cushioning, non-slip material disposed on an upper surface of the base platform. The photographic instrument or accessory may be a digital camera or a video camera.

In both embodiments the extension mechanism may comprise a flat, metallic tape having a flat, elongated distal end and a J-shaped proximal end; and a block securely enclosing a lower portion of the J-shaped proximal end. Particularly, the flat, elongated distal end of the extension mechanism is threadably secured to the base member and an upper portion of the J-shaped proximal end and the block enclosing the lower portion thereof are movably, independently secured to the extendable members in a configuration whereby the extension mechanism extends the extendable members simultaneously from within the base member during movement of the same.

In another embodiment of the present invention there is provided a monopod device for supporting a camera, comprising an extendable mounting member with a first substantially tubular configuration and having a camera mounting assembly disposed thereon; an extendable middle member with a second substantially tubular configuration within which the extendable mounting member is slidably disposed; a locking assembly configured to threadably secure the extendable mounting member and the extendable middle member in extended or collapsed relationship one to the other; a base member with a third substantially tubular configuration within which the extendable middle member is slidably disposed; and an extension mechanism disposed within the base member, each of said members secured independently to the extension mechanism in a configuration whereby both of the extendable mounting member and the extendable middle member telescope simultaneously from within the base member to an extended length upon movement of the extension member.

In this embodiment the locking assembly may comprise a male threaded component disposed around an outer surface of one extendable member and a female threaded component threadably engaged with the male threaded component. The locking assembly may be a quick release assembly.

In this embodiment the camera mounting assembly may comprise a base platform with a threaded opening therethrough and a thread connector having a threaded proximal end threadably engaged with the threaded opening of the base platform and a threaded distal end configured to threadably engage with an attachment point on a camera such that the camera is secured to the base platform. The camera mounting assembly further may comprise a cushioning, non-slip material disposed on an upper surface of the base platform. An example of a camera is a digital camera or a video camera.

In this embodiment the extension mechanism may comprises a flat, metallic tape with a flat, elongated distal end and a J-shaped proximal end; and a middle block having a lower portion configured to enclose a lower portion of the J-shaped proximal end and an upper portion securable within the proximal end of the extendable middle member. Also, the extendable mounting member may comprise an inner block shaped to match the tubular configuration thereof with an upper portion secured within the proximal end of the extendable mounting member and a lower portion secured to an upper portion of the J-shaped proximal end of the extension mechanism.

Provided herein is a device comprising a handheld, extendable, telescoping monopod or an extension or extendible pole with mounting capabilities. The extension pole or monopod comprises a combination of extendable and stationary members, i.e., an extendable mounting member, an extendable middle member and a base member that can be telescoped via a single extension mechanism with a single smooth action by a user to a variable length and which can be set or locked with a rotatable handle lock. The slidable extension mechanism is secured to all members such that a smooth lifting action on the rotating handle lock lifts the extension mechanism and telescopes the monopod members to a desired length and conversely collapses the same. The distal extended end of the extension pole has a mounting assembly, for example, comprising a base platform or mounting plate to which a photographic instrument or accessory, such as, but not limited to, a digital camera, a video camera, a light, etc., may be mounted or attached.

As described below, the invention provides a number of advantages and uses, however such advantages and uses are not limited by such description. Embodiments of the present invention are better illustrated with reference to the Figure(s), however, such reference is not meant to limit the present invention in any fashion. The embodiments and variations described in detail herein are to be interpreted by the appended claims and equivalents thereof.

FIG. 1 is an exploded view of the monopod device. The monopod device comprises four components, an extendable mounting member 100*a*, an extendable middle member 100*b*, a base member 100*c*, and an extension mechanism 100*d*. The extendable mounting member 100*a* comprises a first inner tube or shaft 105. The first inner tube has a pair of slots 105*a,b* formed in parallel along the length of the outer surface. A mounting assembly comprising components 101,102,103,104 is affixed or secured at 130 to the first inner tube. The mounting assembly comprises a base platform 104 with an upper surface portion 104*a* having a central interiorally threaded opening 104*c* recessed therein. The lower portion 104*b* is configured such that the lower opening is disposed over the distal edge of the first inner tube. Disposed on the upper surface portion of the base platform is a material 103, for example, but not limited to a rubber or rubber-like material, that provides one or both of a cushioning or non-slip surface for a camera secured to the mounting assembly. A threaded means, for example a thread converter 102, such as a quarter inch thread converter, passes through the opening in the upper surface of the base platform and is threaded within the threaded opening 104*c* of the base platform and is secured by a nut 101. The threaded means or thread connector extends outwardly from the base platform and is configured to threadably receive a digital or video camera at its attachment point.

The monopod device comprises a locking assembly or means for locking the extendable mounting member 100*a* and the extendable middle member 100*b* at a desired extended length. The locking assembly comprises three components, a rotating hand lock 106, a lock ring 107 and a threaded hand lock tube 112. The rotating hand lock 106 is disposed around the outer surface of the first inner tube 105 and the lock ring 107 is disposed within the rotating hand lock. The rotating hand lock has a female or threaded inner surface 106a. The threaded inner surface is threadably engaged with a correspondingly male threaded outer surface 112a of the threaded hand lock tube 112. The lock ring secures the rotating hand lock. Such configuration enables the rotating handle lock to be quickly threadably locked or secured to the threaded hand lock tube or released therefrom with a smooth twist thereof to threadably engage or disengage the rotating hand lock from the threaded hand lock tube. The first inner tube 105 comprises an opening 132 therethrough at the proximal end through which a lock pin or rod 108 can be passed. An inner tube block 109 comprises openings 134, 136 vertically disposed on a side thereof. The inner tube block is configured or shaped to be inserted within the proximal end of the first inner tube such that openings 132, 134 are aligned and the lock pin 108 passes therethrough to secure the upper half of the inner tube block within the inner tube 105. The lower half comprising opening 136 extends exteriorally from the proximal end of the first inner tube when lock pin 108 secures the upper half of the inner tube block within the first inner tube. A screw 111 and washer 110 secures the lower half of the inner tube block to the proximal end of the extension mechanism 100d via opening 136.

The extendable middle member 100b comprises a second middle tube or shaft 113 to which the threaded hand lock tube 112 is secured around the outer surface of the middle tube 113. The middle tube has an opening 142 therethrough at the proximal end which enables it to be secured to the extension mechanism 100d. The open distal end of the hollow shaft 113 is configured to receive the lower portion of the inner tube block 109 of the extendable mounting member 100a at 140 such that in a collapsed configuration the rotating handle lock 106 can be threadably secured to the threaded hand lock tube 112. This enables the mounting assembly comprising 101, 102, 103, 104 to rest on the distal edge of the middle tube 113 such that a digital or video camera may be affixed or threaded thereon. The middle tube comprises a pair of rails 113a,b that protrude from the inner surface of the middle tube along the length thereof. When extended from or collapsed into the middle tube, the slots 105a,b slidably engage the rails which guide the inner tube 105 within the middle tube.

The base member 100c comprises a third outer tube or shaft 123 which has a top outer tube cap 124 at the distal end and a bottom outer tube cap 125 at the proximal end or base of the base member. The base member may comprise a cushioning material, such as, but not limited to, a foam material as is known in the art. The top outer tube cap comprises a lower portion 124b that is configured such that the lower opening thereof is disposed over the distal edge of the outer tube whereby the upper portion 124a of top outer tube cap rests on the distal edge of the outer shaft. The bottom outer tube cap is disposed over the proximal end of the outer tube 123. The middle tube 113 is slidably received within the top outer tube cap such that in a collapsed configuration the proximal end of the threaded hand lock tube 112 with the rotating handle lock 106 threadably engaged thereon is disposed in proximate relationship to the upper edge of the top outer tube cap 124 (see FIG. 3B).

The extension mechanism 100d is disposed substantially within the outer tube 123. The extension mechanism comprises a flexible, flat metallic tape or strip 120 having a substantially J-shaped configuration when the inner tube 105 and the middle tube 113 are collapsed within the outer tube and a middle tube block comprising two halves 115, 116 that, when assembled, enclose a lower portion of the J-shaped proximal end. The flat surface of the elongated portion 120a of the flat metallic tape or strip is disposed along the inner surface of the outer tube such that the distal edge of the flat metallic tape is secured thereto via screw 122 and washer 121 through openings 120c and 123a along 150. The J-shaped portion 120b is independently secured to the proximal ends of the inner tube 105 and the middle tube 113.

The middle tube block comprises halves 115, 116 and a lock pin 114 utilized to secure the middle tube block within the proximal end of the middle tube 113. Moreover, a cylinder wheel 117 with a tube bearing 118 is disposed within the inner curve formed at the lower portion of the J-shaped proximal end 120b such that the ends of the tube bearing protrude from each end thereof. Each half 115, 116 of the middle tube block has an upper and a lower portion such that in cross-section one is able to see that each lower portion is configured to receive therein a lower curved edge of the J-shaped portion and portion of the cylinder wheel. When the halves of the middle tube block are brought together along 150b around the lower portion of J-shaped proximal end of the flat, metallic tape the protruding ends of the tube bearing 118 are received into openings 115a and 116a in the lower portion of the middle tube block to hold the halves together. The two halves of the middle tube block are further threadably secured via screw 119 at 154. The upper portions of the assembled middle tube block 115, 116 are secured within the proximal end of the middle tube 113 via lock pin 114 which passes through the opening 113c in the proximal end of the middle tube at 142 and through the openings 115b, 116b along 150a.

The inner tube 105 is threadably secured to an upper portion of the J-shaped proximal end of the flat metallic tape via screw 111 and washer 110. The lower portion of the inner tube block 109 is disposed within the J-shaped proximal end such that opening 136 in the inner tube block is aligned with opening 152 of the flat metallic tape at the inner surface thereof and washer 110 is aligned with opening 152 on the outer surface thereof. When secured to the extension mechanism, the lower portion of the inner tube block 109 is disposed above the assembled middle tube block components 115, 116.

Thus, the extension mechanism is secured to the inner 105, middle 113 and outer 123 tubes. This configuration enables the extendable mounting member 100a and the extendable middle member 100b to telescope smoothly from the base member 100c with a single, smooth pulling action. The monopod device is configured such that when a user grasps the base member 100c with one hand and the rotating handle lock 106 with the other hand, the extendable middle 100b and extendable mounting 100a members will smoothly telescope out from the base member via the extension mechanism 100d along 160 when the rotating handle lock is quickly released from the threaded hand lock tube 112 and pulled directionally away from the base member. Because the distal end of the elongate portion 120a of the extension mechanism is secured to the distal end of the inner tube and the proximal ends of the inner and middle tubes are independently secured to the proximal J-shaped end 120b of the extension mechanism, the inner and outer tubes must move together. To enable this the J-shaped end can move upwardly along 160 with the inner and middle tubes while the distal end of the extension mechanism remains stationary.

Once the desired length is achieved a quick twist of the rotating handle lock 106 locks it onto the threaded hand lock tube 112 thereby securing the extended monopod members at the desired length. Conversely, the monopod device is quickly and easily collapsed with a quick release of the rotating handle lock that enables the inner and middle tubes to collapse into the base member along 160 until the J-shaped proximal end has moved downwardly to the proximal end of the base member.

When collapsed, a user can threadably affix a digital camera or a video camera to the thread converter 102 to threadably secure it to the base platform 104. to rest on the support plate 103 comprising mounting member. As is known in the art, cameras comprise an attachment point at the underside thereof by which to be mounted or affixed to devices, such as a tripod or a monopod. In the collapsed configuration, the monopod is of a height such that attachment is easily accomplished.

The monopod device may be extended to variable lengths determined by a user's preference and/or the requirements of a photographic or videographic opportunity. Therefore, the outer surface of the inner tube 105 may comprise a ruler or markings thereon to indicate the height of the camera when the bottom outer tube cap 125 rests on the ground. In a non-limiting example, the fully extended height of the monopod device may be about 155 cm or about 61 inches. The markings denoting height are printed on the inner tube in reverse order.

That is, when fully extended the measure of 155 cm is located at the proximal end of the inner tube at the distal edge of the middle tube 113. The height in centimeters or inches decreases up the inner tube toward the distal end so that to whatever height the monopod device is extended or collapsed, the measure shown near the distal edge of the middle tube is the correct height.

Figure 2A:
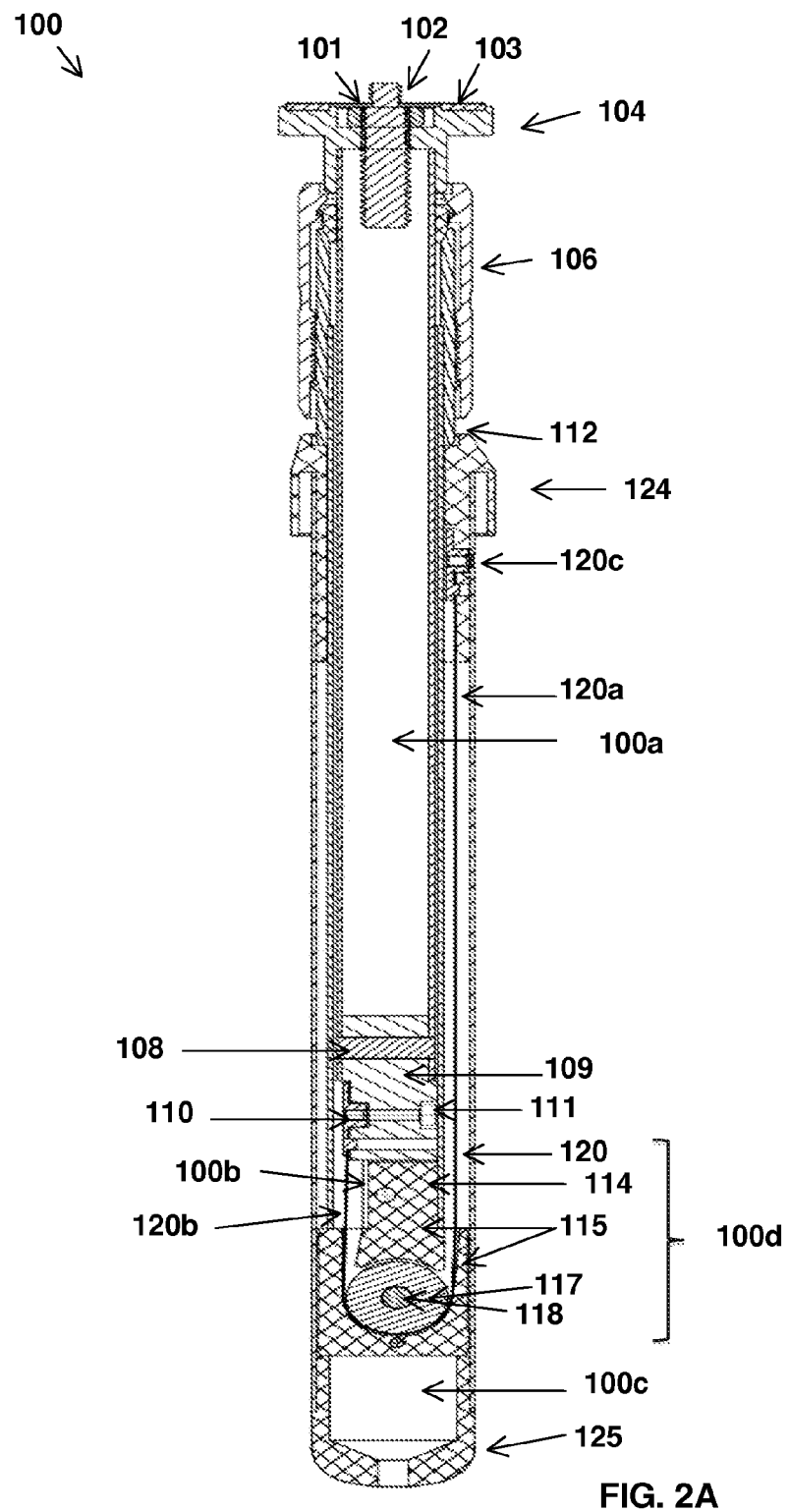
FIGS. 2A-2B are cross-sectional views of the monopod device depicting the telescoping sections in a retracted (FIG. 2A) and elongated (FIG. 2B) configurations.
Figure 2B:
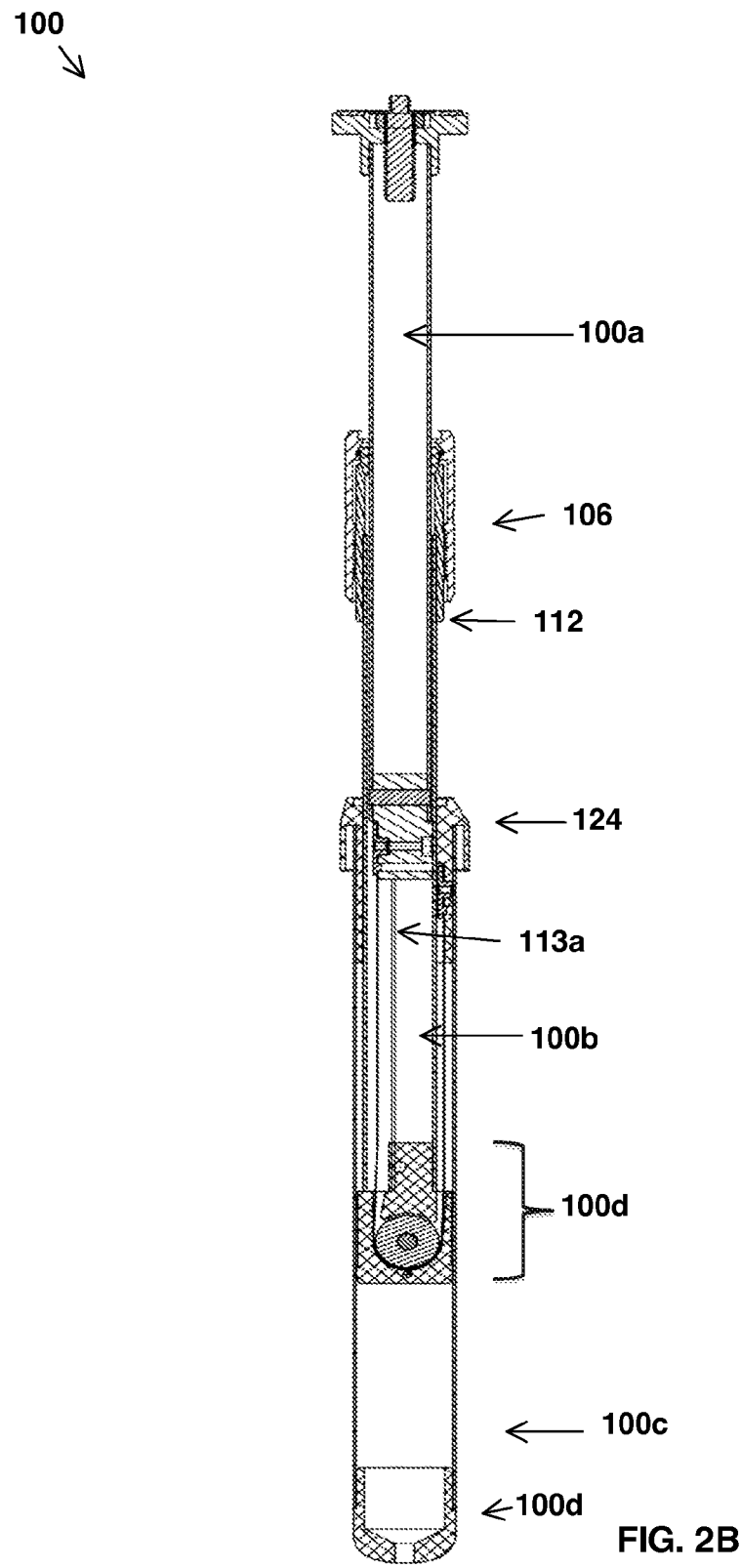

With continued reference to FIG. 1, FIGS. 2A and 2B show cross-sectional views of the monopod device 100 in a collapsed and extended configuration. In FIG. 2A the relationship of the various members and components of the monopod device are depicted. The extendable mounting member 100a is collapsed into the extendable middle member 100b which is collapsed within base member 100c. In the collapsed configuration the J-shaped portion 120b of the extension mechanism 100d is at the proximal portion of the outer tube 123, proximate to the bottom outer tube cap 125 and the distal portion 120a is secured at opening 120c to the inner surface thereof proximate to the top outer tube cap 124. The lower portion of the inner tube block 109, secured to the J-shaped proximal end of the extension mechanism with the screw 111 and washer 110 and the upper portion is secured to the inner tube 105 with lock pin 108. The cross-sectional view depicts the disposition of the upper and lower portions of the middle tube block in relation to the J-shaped proximal end 120b of the extension mechanism and to the cylinder wheel 117 and tube bearing 118. The inner tube block is disposed above the middle tube block. Moreover, one can easily view the disposition of the rotating handle lock 106 disposed over the threaded hand lock tube 112 and proximate to the top outer tube cap 124 and the disposition of the mounting assembly components 101,102,103,104 at the distal end of the inner tube 105.

FIG. 2B illustrates how the extension mechanism functions when the monopod device 100 is in an extended configuration. When the rotating handle lock 106 has been rotably loosened from the threaded hand lock tube 112 and pulled upwardly, the extendable mounting member 100a is telescoped outwardly from within the extendable middle member 100b, which is telescoped outwardly from within the base member 100c. The rail 113a along which the inner tube 105 moves is shown. Because both the inner 105 and middle 113 tubes are secured to the proximal end 120b of the extension mechanism 100d, both the inner and middle tubes move outwardly together in a telescoping motion. The J-shaped proximal end 120b of the extension mechanism is drawn upwardly with the inner tube 105 which causes the assembled middle tube block 115, 116 also to be raised within the outer tube 123 thereby telescoping the extendable middle member 100b along with the extendable mounting member. The process is reversed when the monopod device is collapsed returning it to the configuration shown in FIG. 2A.

With continued reference to FIG. 1, FIG. 3 is top view of the mounting assembly. The view depicts the disposition of the components 101,102,103,104 in relationship to one another. The cushioning and/or non-slip material 103 is disposed on the upper surface of the base platform 104. The threaded means or thread converter 102 is disposed through the center of the base platform and is threadably engaged therewith and secured thereto with nut 101 such that the distal end of the thread converter is able to threadably engage the attachment point of a camera to secure it to the base platform.

With continued reference to FIG. 1, FIGS. 4A, 4B, 4C show the monopod device in a collapsed configuration, partially extended and completely extended. In FIG. 4A the monopod device 100 is depicted completely collapsed where only the extendable mounting member 100a, the rotating handle lock 106, the top outer tube cap 124, the base member 100c and the bottom outer tube cap are visible. In FIG. 4B, in addition to the viewable components in FIG. 4A, the monopod device 100 is depicted with the members partially telescoped. Thus, the extendable mounting member 100a and the extendable middle member 100b are partially extended. In FIG. 4C, in addition to the viewable components in FIG. 4A, the monopod device 100 is depicted with the members fully telescoped. Both of the extendable mounting member 100a and the extendable middle member 100b are completely extended. FIGS. 4A, 4B and 4C also illustrate how the monopod device can be extended to various user-determined lengths.

The present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Also, the terms in the claims have their plain, ordinary meaning unless otherwise explicitly and clearly defined by the patentee.

What is claimed is:

1. A device for supporting a digital camera or a video camera, comprising:
   an extendable inner tubular member;
   an extendable middle tubular member, said extendable inner tubular member slidably disposed therein;
   a base member, said extendable middle and inner tubular members slidably disposed therein;
   an extension mechanism disposed within the base member, each of said extendable middle and inner tubular members and base member independently secured thereto, said extension mechanism configured to extend the extendable inner and middle tubular members simultaneously from within the base member during movement of the same;
   a mounting assembly affixed at a distal end of the extendable inner tubular member and comprising a base platform with a threaded opening therethrough configured to threadably receive a thread connector therein, said thread connector also configured to threadably engage with an attachment point on the digital camera or on the video camera such that the same is secured to the base platform; and a quick release locking assembly comprising a male threaded component disposed around an outer surface of one extendable member and a female threaded component threadably engaged with the male threaded component, said quick release locking assembly configured to threadably lock said extendable middle and inner tubular members at an extended length.

2. The device of claim 1, wherein the first inner tubular member is extendable from within the second middle tubular member.

3. The device of claim 1, wherein the second middle tubular member is extendable from within the base member.

4. The device of claim 1, further comprising a cushioning, non-slip material disposed on an upper surface of the base platform.

5. The device of claim 1, wherein the extension mechanism comprises:
   a flat, metallic tape having a flat, elongated distal end and a J-shaped proximal end; and
   a block securely enclosing a lower portion of the J-shaped proximal end.

6. The device of claim 5, wherein the flat, elongated distal end of the extension mechanism is threadably secured to the base member and an upper portion of the J-shaped proximal end and the block enclosing the lower portion thereof are movably, independently secured to the extendable middle and inner tubular members.

7. A monopod for supporting a camera, comprising:
   an extendable mounting member with a first substantially tubular configuration and having a camera mounting assembly disposed thereon;
   an extendable middle member with a second substantially tubular configuration within which the extendable mounting member is slidably disposed;
   a locking assembly configured to threadably secure the extendable mounting member and the extendable middle member in extended or collapsed relationship one to the other;
   a base member with a third substantially tubular configuration within which the extendable middle member is slidably disposed; and
   an extension mechanism disposed within the base member, each of said members secured independently to the extension mechanism in a configuration whereby both of the extendable mounting member and the extendable middle member telescope simultaneously from within the base member to an extended length upon movement of the extension member.

8. The monopod of claim 7, wherein the locking assembly comprises a male threaded component disposed around an outer surface of one extendable member and a female threaded component threadably engaged with the male threaded component.

9. The monopod of claim 7, wherein the locking assembly is a quick release locking assembly.

10. The monopod of claim 7, wherein the camera mounting assembly comprises:
    a base platform with a threaded opening therethrough; and
    a thread connector having a threaded proximal end threadably engaged with the threaded opening of the base platform and a threaded distal end configured to threadably engage with an attachment point on a camera such that the camera is secured to the base platform.

11. The monopod of claim 10, further comprising a cushioning, non-slip material disposed on an upper surface of the base platform.

12. The monopod of claim 7, wherein the extension mechanism comprises:
    a flat, metallic tape with a flat, elongated distal end and a J-shaped proximal end; and
    a middle block having a lower portion configured to enclose a lower portion of the J-shaped proximal end and an upper portion securable within the proximal end of the extendable middle member.

13. The monopod of claim 12, wherein the extendable mounting member comprises an inner block shaped to match the tubular configuration thereof with an upper portion secured within the proximal end of the extendable mounting member and a lower portion secured to an upper portion of the J-shaped proximal end of the extension mechanism.

14. The monopod of claim 7, wherein the camera is a digital camera or a video camera.

* * * * *